Inventor.
Alfred J. Muhlbach
Attorney.

Sept. 2, 1930.  A. J. MUHLBACH  1,774,809
DIE
Filed Aug. 31, 1925   5 Sheets-Sheet 2
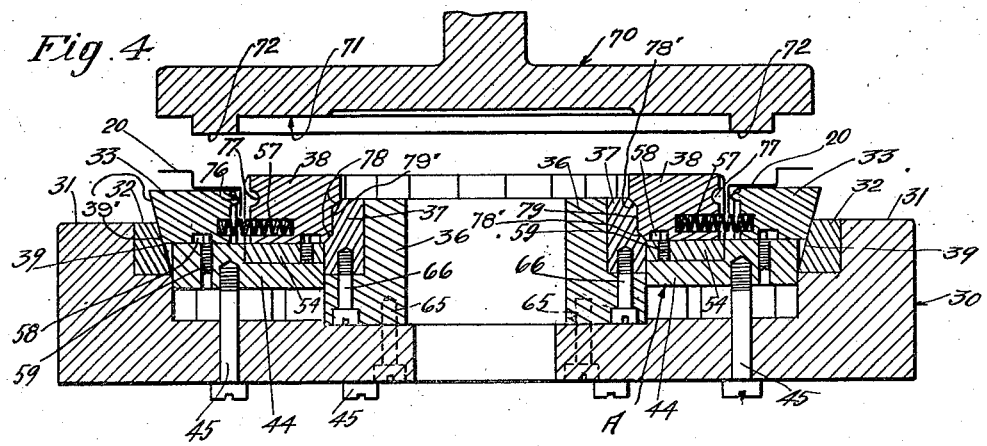
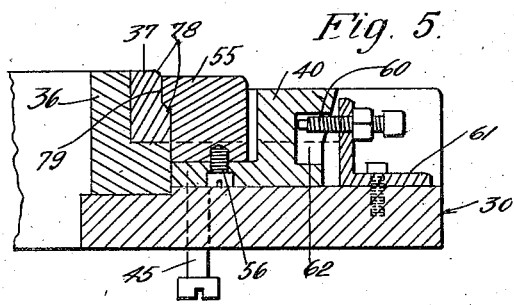
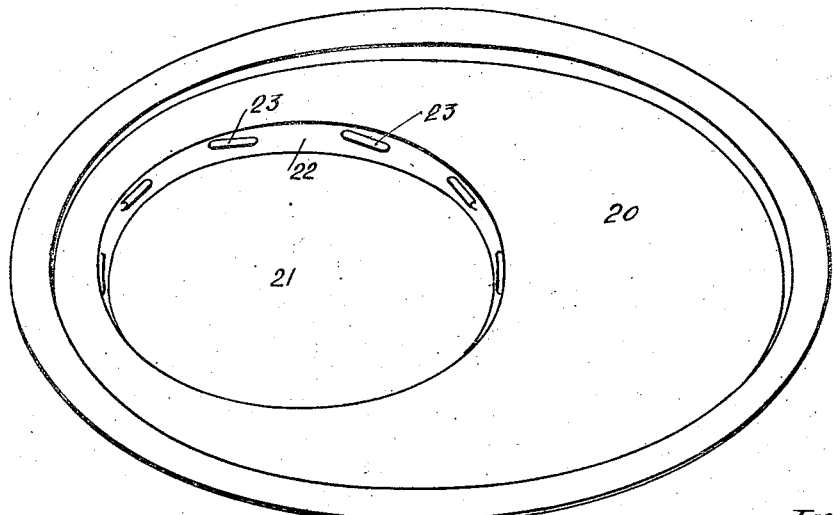
Inventor.
Alfred J. Muhlbach.
Attorney.

Sept. 2, 1930.  A. J. MUHLBACH  1,774,809
DIE
Filed Aug. 31, 1925  5 Sheets-Sheet 3
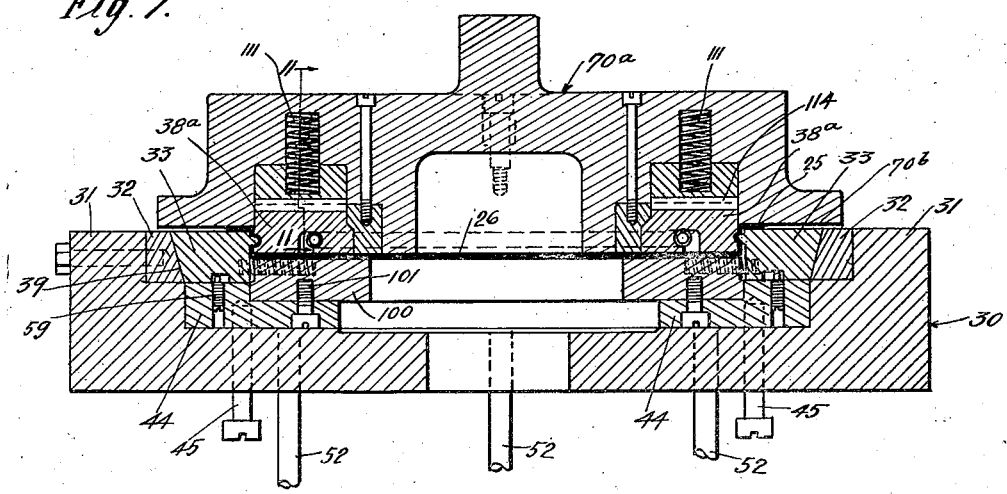
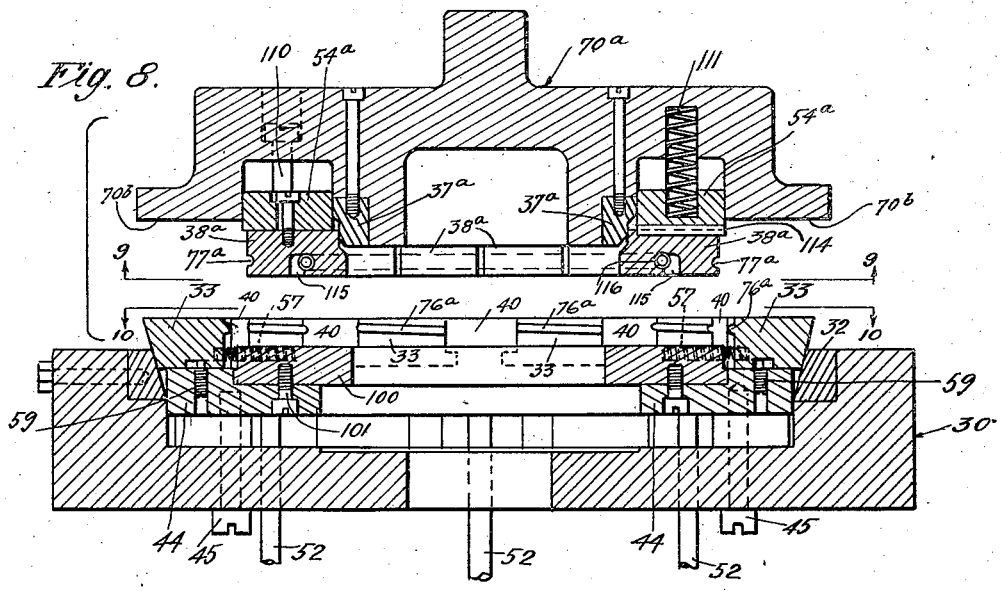
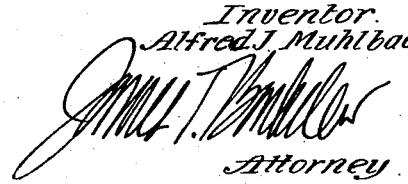

Sept. 2, 1930.  A. J. MUHLBACH  1,774,809
DIE
Filed Aug. 31, 1925   5 Sheets-Sheet 4
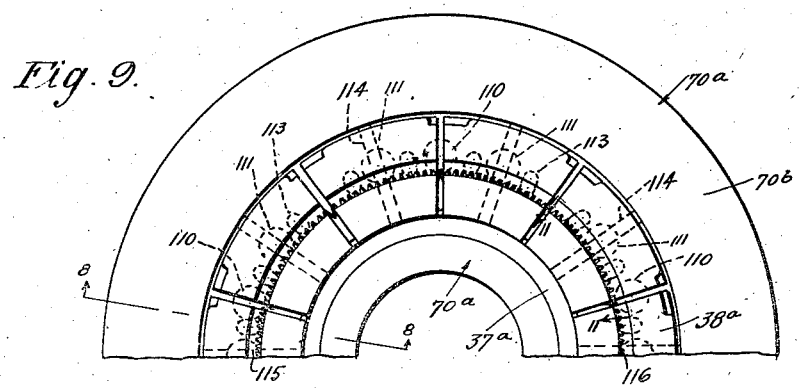
Fig. 9.
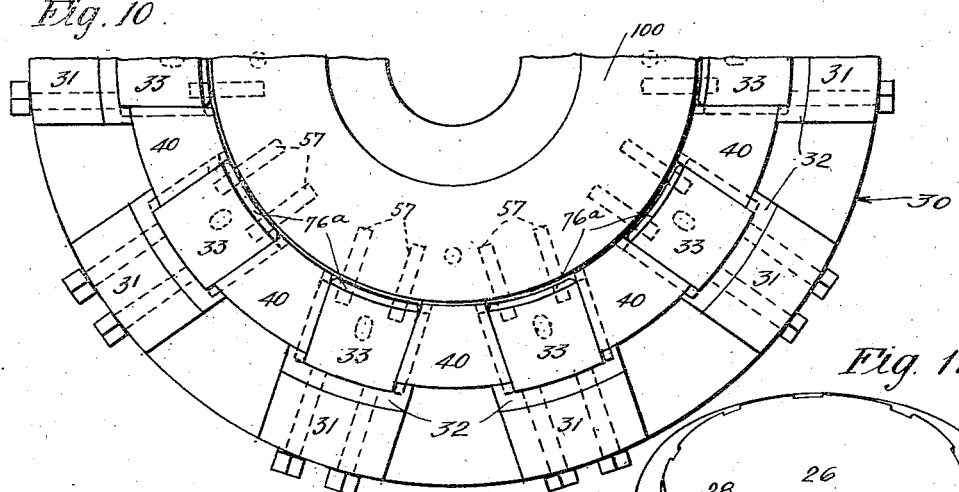
Fig. 10.
Fig. 12.
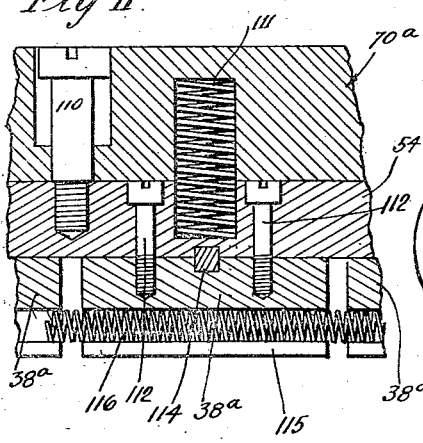
Fig. 11.
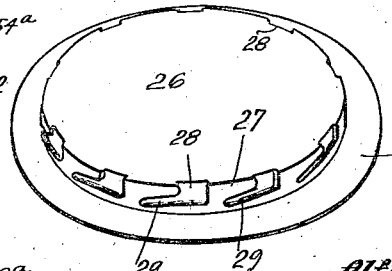
Fig. 13.
Inventor.
Alfred J. Muhlbach.
Attorney.

Sept. 2, 1930.  A. J. MUHLBACH  1,774,809
DIE
Filed Aug. 31, 1925  5 Sheets-Sheet 5

Inventor
Alfred J. Muhlbach

Attorney

Patented Sept. 2, 1930

1,774,809

UNITED STATES PATENT OFFICE

ALFRED J. MUHLBACH, OF LOS ANGELES, CALIFORNIA, ASSIGNOR TO BOYLE MANUFACTURING COMPANY, OF LOS ANGELES, CALIFORNIA, A CORPORATION OF CALIFORNIA

DIE

Application filed August 31, 1925. Serial No. 53,499.

This invention has to do with the art of forming and punching dies as applied to sheet metal; and the invention covered by the present application lies in the provision of a die or dies for forming a new type of head and cover for containers, cans, drums, etc. Heretofore containers such as large sized cans or drums having comparatively large openings in the upper head have usually been provided with bolted or friction covers. The friction covers, although simple, are not practical in many cases, and are liable to be deformed. Bolted closures have been inconvenient in many respects; they are troublesome to take off and replace; and in a good many cases they will not be replaced tightly because of the time necessarily involved. Besides that, the bolts are liable to be bent or broken and they commonly become rusty and difficult of operation. They also form projections on the top of the container. It is these objectionable features that this invention has been designed to overcome by providing a closure that has no projecting part, that is easily, quickly and tightly put into place and as easily and quickly removed. The closure itself is the particular subject-matter of Patent No. 1,598,098 dated August 31, 1926, issued on a companion application entitled Closure for sheet metal containers, filed on even date herewith and bearing Serial Number 53,498; while this present application deals particularly with the dies for forming the closure.

The invention, so far as the dies are concerned, will be best understood, without further preliminary observations, from the following detailed description wherein a preferred, specific and illustrative form of the invention is set out. Due to the nature of the dies, it is necessary that the specific illustrative form be described with some particularity in order to make the invention clearly understood; but I do not mean thereby to limit the invention to such particularly described details, those being set out only for the purpose of enabling those skilled in the art to understand fully one preferred embodiment of the invention. For the purpose of such detailed description, the accompanying drawings are referred to, wherein:

Fig. 4 is a central vertical section showing the die in open position;

Fig. 5 is a detail section on line 5—5 of Fig. 1;

Fig. 6 is a perspective showing the head that is formed by the die shown in Figs. 1 to 5;

Fig. 7 is a vertical central section showing the cover forming die in closed position;

Fig. 8 is a similar view showing the cover-forming die in open position, the left-hand half of the section of the upper part of the die, however, being taken as indicated by line 8—8 on Fig. 9 for purposes of illustration;

Fig. 9 is an under side plan of the upper portions of the die, this view being taken as indicated by line 9—9 on Fig. 8;

Fig. 10 is a plan of the lower portions of the die taken as indicated by line 10—10 on Fig. 8;

Fig. 11 is a detail section taken as indicated by line 11 on Fig. 7 and line 11—11 on Fig. 9;

Fig. 12 is a perspective showing the cover blank (up-side down) in the form in which it is fed to the die of Figs. 7 to 11;

Fig. 13 is a similar perspective showing the finished cover;

Figure 1:
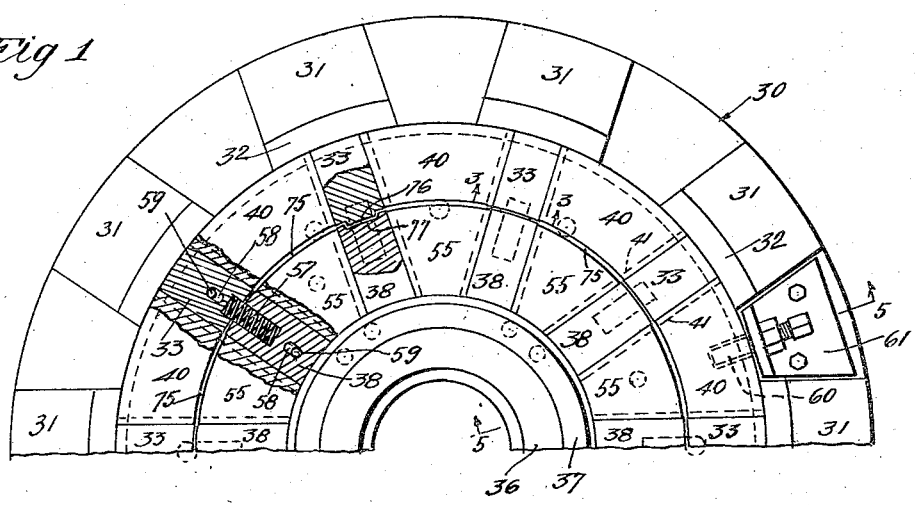
Fig. 1 is a half plan with parts broken away showing the head-forming die.

In order to give a clear idea of the operations performed by the two dies, the closure itself will first be described. In the usual arrangement the closure is placed in a head of the container, for instance, such a container as a drum. Thus although it will be apparent that the closure may be placed otherwise upon a container, it will be described as placed upon the head. Accordingly in Fig. 6 a head 20 is shown with an opening 21 surrounded by a downwardly turned flange 22; this flange having at appropriate spacings a plurality of inwardly projecting lugs 23 of about the proportions illustrated. In the particular embodiment of the invention here illustrated there are ten of these lugs, spaced evenly around the inner circumference of the flange, although, of course, the number of locking lugs and likewise the number of lug-receiving recesses on the cover may be varied. Each of these locking lugs 23 is pressed from the metal of the flange by pressing that metal inwardly; and each locking lug stands in a slight angular position with reference to the plane of the head.

The cover as shown in Fig. 13 has an upper peripheral flange 25 adapted to rest upon upper surface of drum 20 around its opening 21, the flange being wide enough to accommodate below it a gasket of suitable width to make the closure fluid tight. The cover has a centrally sunk portion 26 whose peripheral wall 27 is adapted to fit just nicely into opening 21, and this wall has reaching up from its lower edge, a plurality of recesses 28 of suitable circumferential dimensions to pass the locking lugs 23 when the cover is first inserted in opening 21. Then a rotation of the cover through a slight angle will bring the inclined grooves 29 into engagement with lugs 23; and the inclination of lugs 23 and grooves 29 causes the cover to be clamped down tightly upon the gasket or upon the head by this slight rotation. The angle (the pitch of the theoretic spiral upon which grooves 29 are laid) is relatively small, so that when the cover is once clamped into position, frictional engagement of lugs 23 with the walls of the grooves 29 prevents the cover from working loose. It will be understood that the cover is made to fit fairly snugly and yet easily into opening 21, that recesses 28 pass lugs 23 freely and that grooves 29 take lugs 23 freely, but without any undue looseness; and that the dies are properly dimensioned in their parts that act directly upon the metal to form all these parts to their proper proportional sizes.

The head forming die shown in Figs. 1 and 5 sets on a circular base 30 that has ten outer or peripheral bosses 31, each carrying a wedge block 32 whose functions are to operate the corresponding outer die blocks 33, that is, to force said die blocks inwardly when those die blocks are moved downwardly, as will be described. Mounted at the center of the base is an inner stationary ring 36 that carries inner die block operating wedge ring 37 whose function is to operate the inner die blocks 38, that is, to move said blocks 38 outwardly when they are moved downwardly, as will be described. Wedge blocks 32 have inner wedge faces 39 that are formed as segments of a conical surface, as will be seen from inspection of Figs. 1 and 2. The outer ends of die blocks 33 have corresponding conical wedge faces 39' to seat outwardly and act against the wedge faces of the wedge blocks; but the wedge blocks have a greater peripheral extent than the die blocks (see Fig. 1) so that the wedge blocks not only come into contact with the outer ends of the die blocks, but also are contacted, when the parts are in the position shown in Fig. 2, by the outer surfaces of filler blocks 40 that lie between die blocks 33 and form side guides for those die blocks. Filler blocks 40 are undercut as shown most clearly at 41 in Fig. 3 to form guide grooves for the tongues 42 at the lower edges of blocks 33, the blocks being thus confined to radial movement with reference to blocks 40 and the ring 44 of which blocks 40 form integral parts and which may be considered a die block carrying ring structure A surrounding stationary rings 36 and 37 and confined exteriorly by base bosses 31. It is ring 44 that moves vertically and carries with it in such vertical movement the die blocks 33 and 38.

Figure 2:
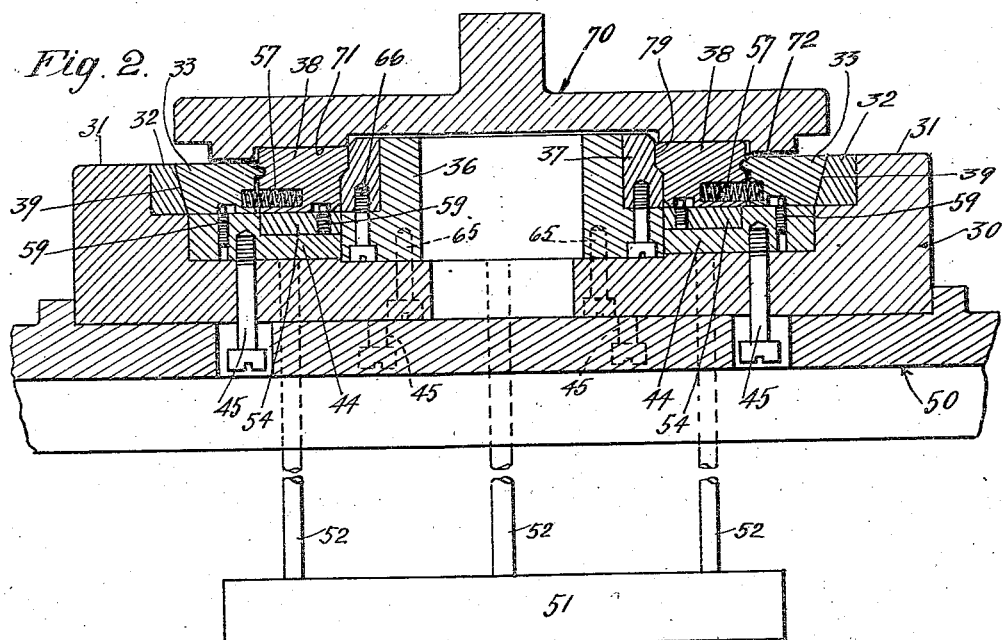
Fig. 2 is a vertical central section of the die in its closed position.
Figure 3:
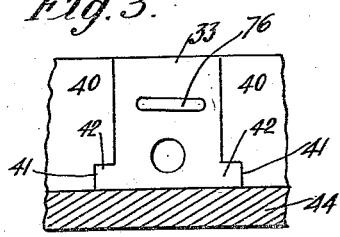
Fig. 3 is a detailed section taken as indicated by line 3—3 on Fig. 1.
Figure 14:
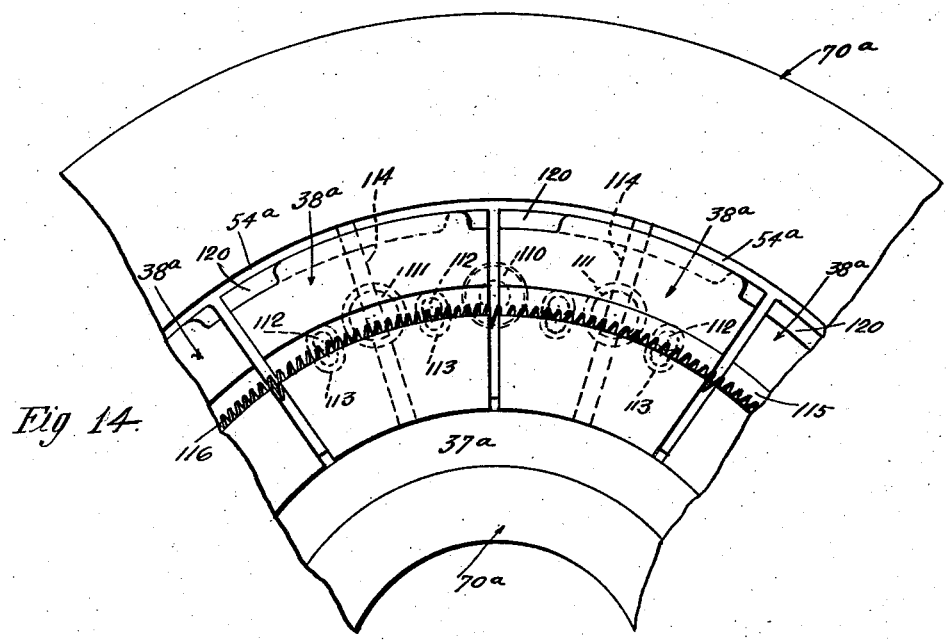
Fig. 14 is a fragmentary enlargement of portions of the plan of Fig. 9.
Figure 15:
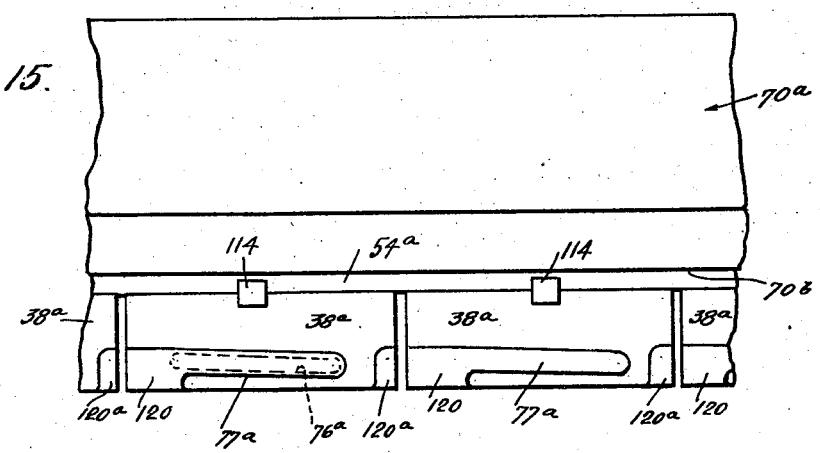
Fig. 15 is a side elevation of the portions shown in Fig. 14.

Carrier ring 44 fits accurately into the space outside ring 36 and inside bosses 31, being thus confined accurately in position and prevented from being radially displaced. Between these two circumferential confining walls carrier ring 44 may move between the positions shown in Figs. 2 and 4; and a suitable number of movement limiting bolts 45 are threaded into ring 44, their lower heads bringing up against the lower face of base 30 when ring 44 reaches the position shown in Fig. 4. The position shown in Fig. 4 is what may be termed the normal position of the parts—the position at the beginning of an operation. Bolts 45 also perform the function of preventing circumferential movement of carrier ring 44 and its supported parts, thus keeping the die blocks in proper radial alignment with the stationary parts of the die. Ring 44 and its connected parts are supported in this upper position by any suitable device. For instance for this purpose it is common to use below the table 50 a pneumatic device that provides a yielding support, the pneumatic pressure being capable of variation to suit the pressure to the purposes. Thus as an illustration the pneumatically supported head 51 is shown in Fig. 2 with pins 52 that pass up through table 50 and base 30 to contact with the under face of ring 44. This arrangement, however, may be varied. It will be apparent that any suitable yielding or resilient support of carrier ring 44 will suffice for the operative purposes here explained.

Carrier ring 44 carries filler blocks 40 as hereinbefore stated, and it also carries a secondary ring 54 upon which the inner die blocks 38 are mounted. These inner die blocks are confined to slide between filler blocks 55, which preferably form integral parts of ring 54, these inner die blocks 38 being confined and guided between blocks 55 in the same manner as that in which outer die blocks 33 are confined and guided between blocks 40. Secondary ring 54 is immovably secured to carrier ring 44, as for instance by bolts or cap screws, one of which is shown at 56 in Fig. 5; so that the inner and outer die blocks 38 and 33 are located in opposing pairs in the manner shown in Fig. 1. Between each pair of die blocks a compression spring 57 acts to move block 33 outwardly and block 38 inwardly; and each of the blocks is provided in its under surface with a small recess 58 into which the head of a screw pin 59 projects for the purpose of limiting the spring actuated movements of the die blocks whenever the vertically movable parts of the device are removed from the other parts. These movement limiting pins 59 play no part in the operation of the die. Likewise there are two limiting pins 60 (only one of which is shown in the plan of Fig. 1) mounted on angle brackets 61 secured to base 30 and projecting into recesses 62 in the outer faces of two of the blocks 40; the functions of these limiting pins being merely to prevent any accidental removal of the inner movable parts of the apparatus from the outer or stationary parts when the die is being moved from place to place.

Inspection of the drawings will indicate clearly how the various parts are held together. Ring 36 is held immovable on base 30 by suitable bolts of cap screws 65, and wedge ring 37 is held immovable on ring 36 by similar screws or bolts 66.

The operating head 70 is adapted to be mounted upon and reciprocated by the vertically moving slide of the press. This head 70 has a downwardly facing annular surface 71 adapted to come into contact with the upper faces of inner die blocks 38 and simultaneously with the upper faces of the inner filler blocks 55. Outside this annular surface 71 head 70 has another and lower annular surface 72 adapted to come into contact with the sheet metal of head 20 (which is resting on outer die blocks 33 and filler blocks 40) substantially at the same time that surface 71 contacts with the inner die blocks. When the die is in its open position, as shown in Fig. 4, there is sufficient space between the die blocks and the under surface of head 70 for the free insertion of a head 20 to be operated upon. Head 20 at that time is in the form shown in Fig. 6 excepting that is flange 22 is plain and smooth, not having the locking lugs 23. When the head 20 is put into place, flange 22 fits downwardly into the open annular space that is made up of the permanently open spaces 75 (see Fig. 1) between blocks 40 and 55 and the then wide open spaces between die blocks 33 and 38, blocks 33 being at the outward limit of their radial movements and blocks 38 being at the inward limit of their radial movements. For the closures that are now being made it is found that a radial movement of about ¼" for each of the die blocks is sufficient to leave a clear open space between the opposing ends of the blocks for insertion of the head flange. Vertical movement of the die blocks, it might be mentioned, is, in this particular design, made to be a movement of 1". In this open position of the dies the punch boss 76 on inner face of each outer die 33 is moved outwardly far enough that initial placing of flange 22 will not be interfered with, while the outer end face of die block 38 that carries the recess 77 corresponding to punch boss 76 is moved inwardly inside the outer faces of blocks 55. Blocks 55 and inner die blocks 38 extend upwardly to a plane above the upper surface of outer die blocks 33 and outer blocks 40. These inner blocks 38 and 55, or more particularly speaking, the inner blocks 55 alone, form convenient guides for the easy and quick placement of head 20 in proper position; head 20 being merely moved into the space over the die and its flange 22 dropped into position around the blocks 55.

The head 20 being in position, the operating head 70 moves down and its surfaces 71 and 72 come into contact with underlying parts, as before described. Surface 72, by its contact with the sheet metal head 20, serves as a work holder to prevent any accidental displacement of the sheet metal as the operation is performed. As head surface 71 presses die blocks 38 downwardly, they all move immediately outwardly. It will be noted that wedge ring 37 has two rather abruptly inclined annular wedge faces 78 separated by the vertical annular face 79, and that the inner end faces of die blocks 38 are correspondingly formed, having wedge faces 78' separated by vertical annular face 79'. It will be seen that the assembly may be considered as including outer wedge blocks 32 outside outer die blocks 33, and inner wedge ring 37 inside inner die blocks 38, the outer wedge and die blocks having coacting wedge surfaces 39, 39' of relatively lesser angularity and the inner wedge ring 37 and inner die blocks 38 having coacting wedge surfaces 78, 78' of relatively greater angularity. Thus upon the first downward movement of die blocks 38 they are moved radially outwardly to the relative position shown in Fig. 2, to such position that their outer end faces are bearing outwardly against or substantially against the inner surface of flange 22. This position of these inner die blocks is maintained during the remainder of the downward movement to the final position shown in Fig. 2. The outer die blocks, however, are moved inwardly only a slight distance by the time inner die blocks 38 have moved outwardly to their outermost positions, so that the flange 22 is backed on the inside by the inner die blocks before the punch bosses 76 of the outer die blocks begin to exert any forming pressure inwardly against flange 22. On further downward movement of the dies, and further inward movement of die blocks 33, the punch bosses 76 of those outer die blocks are forced inwardly to force the metal of the flange into the corresponding die recesses 77 and form the locking lugs 23. The operation of forming the locking lugs is thus completed when the parts have reached the final position shown in Fig. 2; and upon subsequent upward movement of operating head 70 the carrier ring 44 and all its carried parts and the die blocks move upwardly, the die blocks 38 and 33 move radially inwardly and outwardly, respectively, and the sheet metal head with its formed lugs 23 is freed so that it can then be lifted and then laterally removed from the die. It will be understood this subsequent upward movement of ring 44 and its carried parts is brought about through upward movement of pneumatically supported head 51 and its associated rods 52, said head and rods having been previously forced downward against the supporting pneumatic pressure by the superior downward pressure of head 70 at the proper time during the forming operation.

The die shown in Figs. 7 to 15 for forming the cover is similar in operative principles to the die previously explained, but due to the formation of the cover itself, a part of this die—the inner die blocks and their operating parts—are carried by the upper operating head 70ª, while the outer die blocks are carried by the base 30. Base 30 is the same as before explained, having the bosses 31 which carry the outer wedge blocks 32 outside outer die blocks 33. Carrier ring 44 is also substantially the same as before described and carries outer die blocks 33 for vertical movement therewith and radial movement thereon. Carrier ring 44 carries a secondary ring 100 secured to it by cap screws 101 and the springs 57 for moving the outer die blocks outwardly are recessed in this ring 100. Carrier ring 44 has the same integral filler blocks 40 as before described, and cap screws or bolts 45 have the same functions as before described.

The punch bosses 76ª on die blocks 33 are substantially longer than corresponding bosses 76 on die blocks 33 of the previously explained die, the bosses 76ª being designed to form the longer grooves 29 in the cover, and these grooves being long enough to allow considerable relative travel between grooves 29 and locking lugs 23. The cover when put into the die of Fig. 7 has previously been formed to the configuration shown in Fig. 12 with the recesses 28 drawn into it during or in connection with the action of drawing the central sunk part of the cover. When the cover, in the condition of Fig. 12, or what may be called the cover blank, is placed in the die of Figs. 7 and 8, it is necessary that recesses 28 be properly aligned with reference to the die, so that grooves 29 will subsequently be formed in the cover in proper relation to recesses 28. How this is done will be hereafter explained.

Operating head 70ª carries a ring 54ª and this ring carries on its under face the inner die blocks 38ª, the die blocks being so carried on ring 54ª as to be movable vertically with it, but movable radially with relation thereto. How this is done will be best understood from an inspection of Fig. 11. Ring 54ª is limited in its downward movement with respect to head 70ª by means of bolts or cap screws 110 and is normally pressed down by recessed springs 111. The several die blocks 38ª are held up against the under face of ring 54ª by cap screws 112, which play in slots 113 in ring 54ª to allow radial motion of the die blocks; the die blocks being guided in true radial motion by radial keys 114. To urge die blocks 38ª radially inwardly they are provided with spring receiving grooves 115 that form as an aggregate a circular groove in which a circularly arranged spiral spring 116 is placed. Head 70ª carries inner wedge ring 37ª whose exterior face formation is the same as described for ring 37, said ring 37ª being inside the inner die blocks 38ª; and die blocks 38ª cooperate with wedge ring 37ª in the same manner as before described, except that here it is upward movement of the die block with reference to the wedge ring (or downward movement of the wedge ring inside the die blocks) that causes outward motion of the die blocks in the first part of the operation.

The punch bosses 76ª on the inner end faces of die blocks 33 are similar to the bosses 76 in the form of Figs. 1 to 5, except that they are somewhat larger and considerably longer, so as to form the groove 29 somewhat larger to accommodate the locking lugs 23 and also to form grooves 29 longer than locking lugs 23 for the purposes before set out. Thus, as shown in the drawings, punch bosses 76ª are made to extend completely across the inner faces of die blocks 33. Likewise the recesses or grooves 77ª in the die blocks 38ª are of considerable length, to correspond with the length of bosses 76ª, and are placed so as to register with bosses 76ª. At the end of each recess or groove 77ª there is a recess 120 in each die block 38ª, these recesses being designed to take the inwardly sunk parts of the cover that form the recesses 28. Each recess 120 may be formed in two adjacent die blocks 38ª, as is clearly shown in Figs. 14 and 15, a small part 120ª of each recess lying in an adjacent die block. This arrangement is made so that the radial action of punch bosses 76ª will center on the center line of the corresponding die block 38ª. The relative position of a punch boss 76ª is shown in dotted lines at 76ª in Fig. 15. The length of the punch boss is made such that one end will project somewhat into the space of recess 120; so that if the initial drawing of the recess 28 in the cover has not been fully accurate, the action of the die blocks will correct any inaccuracy and will also make the back surface of the recess join smoothly with the back surface of the groove 29 that is formed.

Figure 16:
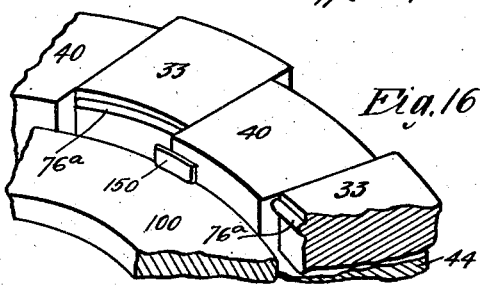
Fig. 16 is a fragmentary perspective of the lower portion of the die of Fig. 8, showing the arrangement of a registration lug.

In order to register the previously formed cover recesses 28 (which of course show as projections on the inner surface of cover wall 27) with recesses 120, there is placed in the die a registration lug 150, best shown in Fig. 16. This lug is of about the same shape as the cross section of recess 28 and is mounted on a stationary filler block 40, but overhangs the end of block 40 as illustrated, so that, as will be seen from Fig. 16, the lug also overhangs an end of an adjacent punch boss 76ª. When the cover is put into the die a recess 28 is easily registered over lug 150, and the cover is then in correct position for the action of the dies as described.

The cover in the form shown in Fig. 12 is placed in the die when the die parts are open, as shown in Fig. 8. This is done as above explained, and during subsequent downward motion of the upper parts of the die the lower surface 70ᵇ of head 70ª comes into contact with cover flange 25 lying over the upper surfaces of die blocks 33; but before that contact occurs the lower surfaces of die blocks 38ª come into contact with the sheet metal of the depressed central portion 26 of the cover which lies upon ring 100. Upon this first contact taking place, as the operating head moves down, die blocks 38ª are stopped from further downward movement, and then the further downward movement of wedge ring 37ª immediately moves die blocks 38ª outwardly so that the inner blocks 38ª are moved out to a position against the inner face of cover flange 27 to form an inner backing for that flange. And this they do before head surface 70ᵇ has contacted with the upper faces of die blocks 33, or at least before die blocks 33 have been moved downwardly any substantial distance, this by reason of the differential in angularity of the wedge surfaces of the inner and outer die blocks and their associated operating wedges, as explained in connection with the equivalent structure of the head forming die. At the same time that die blocks 38ª form an inner backing for the cover flange 27, they are, and are at all times during the operation, pressing down on the cover and holding it down on the ring 100 and thus perform the office of holding the work steadily in position. On further downward motion die blocks 33 are moved downwardly and by the action of wedge blocks 32 are moved inwardly until the parts reach the positions of Fig. 7, when the punch bosses 76ª of die blocks 33 have pressed the metal of the cover flange into the corresponding recesses 77ª of die blocks 38ª and have thus formed the grooves 29 in the cover flange. Subsequent upward movement of upper parts of the die frees the formed cover. In that upward movement all the vertically movable parts move upwardly together, lifted by the thrust of pins 52, until die blocks 33 have reached the upper limit of their travel and are moved outwardly to their outermost positions. The punch bosses 76ª are then out of formed grooves 29. Further upward motion of operating head 70ª then causes inward radial motion of die blocks 38ª, these die blocks still being, by springs 111, pressed down upon the formed cover and holding the formed cover on ring 100 until head 70ª has moved up, with relation to ring 54ª and die blocks 38ª, to such a position that the limiting screws 110 prevent further relative vertical motion between the parts. When this has occurred the inner die blocks 38ª have moved inwardly so as to free themselves from the formed parts of the cover; and then further upward movement of operating head 70ª moves the inner die blocks 38ª upwardly with it and moves them high enough that the formed cover may be removed. For the purposes of effectuating these operations as described, it is only necessary that the resilient or yielding support of ring 44 be stronger than the aggregate pressure of all the springs 111; so that on the downward motion springs 111 will be compressed before carrier ring 44 and the outer dies begin to move down, and so that on the upward motion carrier ring 44 and outer dies 33 will move upwardly to their upper limiting positions before operating head 70ª and wedge ring 37ª begin to move upwardly with relation to inner die blocks 38ª.

While I have described the dies and their operations with some degree of particularity, I have done so for the purpose of making the invention itself clearly and fully understood through the medium of a full detailed understanding of specific embodiments thereof; and not for the purpose of thereby limiting the invention except as is expressly done in the following claims, which claims are to be interpreted in their broad and inclusive meanings as well as in their limited senses.

I claim:

1. A die for operating on a flange or the like, embodying a base, an operating head movable to and from the base, opposing die blocks movable with relation to the base in the direction of movement of the operating head, said blocks being adapted one to press against one side and the other against the opposite side of the flange to be operated on, one of said die blocks having a punch boss and the other a complementary recess, and means to cause opposite transverse movements of the opposing die blocks by virtue of their first mentioned movement and to cause the recessed block to move against the work before the other block moves against it.

2. A die for operating on a flange or the like, embodying a base, an operating head movable to and from the base, opposing die blocks movable with relation to the base in the direction of movement of the operating head, said blocks being adapted one to press against one side and the other against the opposite side of the flange to be operated on, one of said die blocks having a punch boss and the other a complementary recess, and means to cause opposite transverse movement of the opposing die blocks by virtue of the movement of the operating head relative to the base and to cause the recessed block to move against the work before the other block moves against it.

3. A die for operating on a flange or the like, embodying a base, die block carrying rings movable vertically with relation to the base, filler blocks carried by said rings, inner die blocks and outer opposing die blocks mounted on the rings between the filler blocks and movable vertically with the rings and filler blocks and slidable radially on the rings guided between the filler blocks, and wedge members inside the inner die blocks and outside the outer die blocks and adapted to cause opposing radial movements of the die blocks by virtue of their vertical movements.

4. A die for operating on a flange or the like, embodying a base, die block carrying rings movable vertically with relation to the base, filler blocks carried by said rings, inner die blocks and outer opposing die blocks mounted on the rings between the filler blocks and movable vertically with the rings and filler blocks and slidable radially on the rings guided between the filler blocks, a wedge ring inside the inner die blocks, and wedge blocks outside the outer die blocks, adapted to cause opposing radial movements of the die blocks by virtue of their vertical movements.

5. A die for operating on a flange or the like, embodying a base, die block carrying rings movable vertically with relation to the base, filler blocks carried by said rings, inner die blocks and outer opposing die blocks mounted on the rings between the filler blocks and movable vertically with the rings and filler blocks and slidable radially on the rings guided between the filler blocks, a wedge ring inside the inner die blocks, and wedge blocks outside the outer die blocks, adapted to cause opposing radial movements of the die blocks by virtue of their vertical movements, and causing radial movements of one of said die blocks before causing radial movements of the other said die blocks.

6. A die for operating on a flange or the like, embodying a base, die block carrying rings movable vertically with relation to the base, filler blocks carried by said rings, inner die blocks and outer opposing die blocks mounted on the rings between the filler blocks and movable vertically with the rings and filler blocks and slidable radially on the rings guided between the filler blocks, and causing radial movements of one of said die blocks before causing radial movements of the other said die blocks.

7. In a die for operating on a flange or the like, a base, a die block carrying ring mounted on and within the base and slidable vertically with relation thereto, means for urging said ring upwardly and means for limiting such upward movement, spaced filler blocks carried on the upper face of said ring and immovable with relation to the ring, a plurality of radially movable die blocks mounted on the ring between the filler blocks, said die blocks being constrained to slide radially between and guided by said filler blocks, means urging the die blocks outwardly, and wedge means mounted on the base outside the die blocks and adapted by wedging action to cause inward radial movements of the die blocks by virtue of downward motion of the die blocks with the carrying ring.

8. In a die for operating on a flange or the like, a base, a die block carrying ring mounted on and within the base and slidable vertically with relation thereto, means for urging said ring upwardly and means for limiting such upward movement, spaced filler blocks carried on the upper face of said ring and immovable with relation to the ring, a plurality of radially movable die blocks mounted on the ring between the filler blocks, said die blocks being constrained to slide radially between and guided by said filler blocks, means urging the die blocks outwardly, and wedge means mounted on the base outside the die blocks and adapted by wedging action to cause inward radial movements of the die blocks by virtue of downward motion of the die blocks with the carrying ring, the inner ends of said radially movable die blocks when in their outermost positions lying outside the inner ends of said filler blocks so that said filler blocks become registration guides for the placement of a flange or the like within the die blocks when expanded.

9. In a die for operating on a flange or the like, a wedge ring, a die block carrying ring outside the wedge ring, die blocks mounted on said carrying ring and constrained to move radially with relation thereto, means urging the die blocks inwardly toward the wedge ring, and means to cause relative axial movement between the wedge ring and the die blocks and carrying ring, the wedge ring acting on the die blocks by virtue of said axial movement to cause outward radial motion of the die blocks, filler blocks carried by said carrying ring between the die blocks and guiding the die blocks in their radial movements, the outer ends of said filler blocks extending beyond the outer ends of the die blocks when in their inner positions so that the outer ends of the filler blocks become registration guides for the placement of a flange or the like around the outside of the die blocks.

10. A die for operating on a flange or the like, embodying a base, a die block carrying ring structure movable vertically with relation to the base, opposing inner and outer die blocks mounted on said ring structure to move vertically therewith but slidable radially with relation thereto, inner wedge means inside the inner die blocks and coacting therewith to force said die blocks outwardly by reason of relative vertical motion there-between, and outer wedge means outside the outer die blocks and coacting therewith to force said die blocks inwardly upon relative vertical motion there-between, one of said means coacting with these die blocks to move these said die blocks radially before the other die blocks are moved radially by their wedge means.

11. A die for operating on a flange or the like, embodying a base, a die block carrying ring structure movable vertically with relation to the base, opposing inner and outer die blocks mounted on said ring structure to move vertically therewith but slidable radially with relation thereto, an inner wedge ring inside said inner die blocks and adapted to coact with said die blocks to cause outward relative movement thereof by virtue of relative vertical movement, and outer wedge blocks outside said outer die blocks and coacting therewith to move said die blocks radially inwardly by virtue of vertical movement there-between, said outer wedge blocks and outer die blocks having coacting wedge surfaces of relatively lesser angularity, and said inner wedge ring and inner die blocks having coacting wedge surfaces of relatively greater angularity, whereby by virtue of the given amount of relative vertical movement said inner die blocks will move outwardly to their limiting outward positions before said outer die blocks are moved inwardly to their inwardly limiting positions.

12. A die for operating on a flange or the like, embodying a base, a die block carrying ring structure movable vertically with relation to the base, opposing inner and outer die blocks mounted on said ring structure to move vertically therewith but slidable radially with relation thereto, inner wedge means inside the inner die blocks and coacting therewith to force said die blocks outwardly by reason of relative vertical motion there-between, and outer wedge means outside the outer die blocks and coacting therewith to force said die blocks inwardly upon relative vertical motion there-between, said outer wedge means and outer die blocks having coacting wedge faces which cause uniform inward motion of said die blocks throughout said relative vertical motion and said inner wedge means and inner die blocks having abrupt wedge faces that cause outward movement of said inner die blocks during the first part of said relative vertical motion only.

13. A die block for operating on a flange or the like, embodying a base, a die block carrying ring structure mounted on and within the base to slide vertically relative thereto, the base having outer bosses that confine said ring structure exteriorly and having an inner stationary ring surrounded by said carrying ring structure, a die block operating wedge ring mounted on said inner stationary ring, die block operating wedge blocks mounted in said exterior bosses, series of inner and outer die blocks mounted on said vertically movable ring structure, to move vertically therewith and constrained to move radially with relation thereto, the inner ends of said inner die blocks being conformed to and coacting with said wedge ring, and the outer ends of said die block being conformed to and coacting with said wedge blocks, blocks carried on and immovable with relation to said ring structure and acting as spacers between and radial guides for said die blocks, the opposing ends of said inner and outer die blocks when in their innermost and outermost positions respectively lying outside and inside the inner and outer ends respectively of the said filler blocks so that said filler blocks become registration guides for the placement of a flange or the like in the space between.

14. A die for operating on a flange or the like, embodying a base, an operating head movable to and from the base, a die block on the base and movable with relation thereto in the direction of movement of the operating head, a die block carried by the head and movable with relation thereto in the line of movement of the operating head, and means to cause transverse movements of the die blocks by virtue of their first mentioned relative movements.

15. A die for operating on a flange or the like, embodying a base, an operating head movable to and from the base, a die block on the base and movable with relation thereto in the direction of movement of the operating head, a die block carried by the head and movable with relation thereto in the line of movement of the operating head, said blocks opposing one another when the head is moved to the base, and means to cause opposite transverse movements of the die blocks by virtue of their first mentioned relative movements.

16. A die for operating on a flange or the like, embodying a base, an operating head movable to and from the base, a die block on the base and movable with relation thereto in the direction of movement of the operating head, a die block carried by the head and movable with relation thereto in the line of movement of the operating head, said blocks opposing one another when the head is moved to the base, said blocks being adapted one to press against one side and the other against the opposite side of the flange to be operated on, and means to cause opposite transverse movements of the opposing die blocks by virtue of their first mentioned movements and to cause one of the blocks to move against the work before the other block moves against it.

17. A die for operating on a flange or the like, embodying a base, an operating head movable to and from the base, a die block on the base and movable with relation thereto in the direction of movement of the operating head, a die block carried by the head and movable with relation thereto in the line of movement of the operating head, said blocks opposing one another when the head is moved to the base, said blocks being adapted one to press against one side and the other against the opposite side of the flange to be operated on, one of said die blocks having a punch boss and the other a substantially complementary recess, and means to cause opposite transverse movements of the opposing die blocks by virtue of their first mentioned movements and to cause the recessed block to move against the work before the other block moves against it.

18. A die for operating on a flange or the like, embodying a base, an operating head movable to and from the base, opposing die blocks movable with relation to the base in the line of movement of the operating head, said blocks being adapted one to press against one side and the other against the opposite side of the flange to be operated on, and means to cause opposite transverse movements of the opposing die blocks by virtue of their first mentioned movement and to cause one block to move against the work before the other block moves against it.

19. A die for operating on a flange or the like embodying a base, an operating head movable to and from the base, a die block mounted on the head, a die block mounted on the base, said die blocks being movable with relation to the base in the direction of movement of the operating head, and means to cause relative transverse movement of the die blocks by virtue of the movement of the operating head relative to the base.

20. A die for operating on a flange or the like embodying a base, an operating head movable to and from the base, a die block mounted on the head, a die block mounted on the base, said die blocks being movable with relation to the base in the direction of movement of the operating head and opposing one another when the head is moved to the base, and means to cause opposite transverse movement of the die blocks by virtue of the movement of the operating head relative to the base.

21. A die for operating on a flange or the like embodying a base, an operating head movable vertically to and from the base, a die block carrier mounted on the base and movable vertically with relation thereto, a die block carrier mounted on the head and movable vertically with relation thereto, an inner and outer die block, one carried by the carrier mounted on the head and the other carried by the carrier mounted on the base, and wedge members, one on each carrier and adapted to cause transverse movement of the die blocks by virtue of their vertical movement.

22. A die for operating on a flange or the like, embodying a base and an operating head movable vertically to and from the base, a pair of die block carrying rings, one mounted on the base and movable vertically with relation thereto, another mounted on the head and movable vertically with relation thereto, an inner die block mounted on one ring, an outer die block mounted on the other ring, said die blocks being adapted to move vertically with their carrying rings and radially thereon, and wedge members, one at the inner side of the inner die block and another at the outer side of the outer die block adapted to cause radial movement of the blocks by virtue of their vertical movement.

23. A die for operating on a flange or the like, embodying a base and an operating head movable vertically to and from the base, a pair of die block carrying rings, one mounted on the base and movable vertically with relation thereto, another mounted on the head and movable vertically with relation thereto, an inner die block mounted on one ring, an outer die block mounted on the other ring, said die blocks being adapted to move vertically with their carrying rings and radially thereon, wedge means mounted on the head inside the inner die block adapted to move the inner die block outwardly, and wedge means mounted on the base outside the outer die blocks adapted to move the outer die blocks inwardly by virtue of vertical movement of the blocks.

24. A die for operating on a flange or the like, embodying a base and an operating head movable vertically to and from the base, a pair of die block carrying rings, one mounted on the base and movable vertically with relation thereto, another mounted on the head and movable vertically with relation thereto, an inner die block mounted on one ring, an outer die block mounted on the other ring, said die blocks being adapted to move vertically with their carrying rings and radially thereon, and wedge members, one at the inner side of the inner die block and another at the outer side of the outer die block adapted to cause radial movement of one of the die blocks before causing radial movement of the other when the die blocks are moved vertically.

25. A die for operating on a flange or the like, embodying a base and an operating head movable vertically to and from the base, a lower die block carrying ring mounted on the base and movable vertically with relation thereto, an upper die block carrying ring mounted on the head and movable vertically with relation thereto, a plurality of radially movable die blocks mounted on the lower ring and movable vertically therewith, a plurality of radially movable die blocks mounted on the upper ring and movable vertically therewith, wedge means on the head and on the base for engaging the die blocks and means for cooperatively moving said rings to actuate the blocks.

26. In a die for operating on a flange or the like, a base, an operating head movable vertically to and from the base, a lower die block carrying ring movable vertically with respect to the base, yielding means for urging said lower ring upwardly from the base and means for limiting its upward motion, an upper die block carrying ring movable vertically with respect to the head, yielding means for urging said upper ring downwardly from the head and means for limiting its downward motion, a plurality of radially movable upper die blocks mounted on the upper ring and movable vertically therewith, a plurality of radially movable lower die blocks mounted on the lower ring and movable vertically therewith, and wedge means adapted to cause radial movement of the blocks by virtue of their vertical movement.

27. In a die for operating on a flange or the like, a base, an operating head movable vertically to and from the base, a lower die block carrying ring movable vertically with respect to the base and slidable therein, yielding means for urging said lower ring upwardly from the base and means for limiting its upward motion, an upper die block carrying ring movable vertically with respect to the head and slidable therein, yielding means for urging said upper ring downwardly from the head and means for limiting its downward motion, a plurality of radially movable upper die blocks mounted on the upper ring and movable vertically therewith, a plurality of radially movable lower die blocks mounted on the lower ring and movable vertically therewith, and wedge means adapted to cause inward radial motion of the lower die block upon downward movement of the lower ring with respect to the base, and wedge means adapted to cause outward radial motion of the upper die block upon movement of the head with respect to said upper die block.

28. In a die for operating on a flange or the like, a base, an operating head movable vertically to and from the base, a lower die block carrying ring movable vertically with respect to the base, an upper die block carrying ring movable vertically with respect to the head, a radially movable lower die block mounted on the lower ring and movable vertically therewith, a radially movable upper die block mounted on the upper ring and movable vertically therewith, yielding means urging outwardly the die blocks carried on the lower ring, wedge means mounted on the base outside the lower die block and adapted by wedging action to cause inward radial movement of the lower die block by virtue of downward motion of the die block relative to the base, yielding means urging inwardly the upper die block, and wedge means mounted on the head inside the upper die block adapted to cause outward radial movement of the upper die block by virtue of downward motion of the head relative to said upper die block.

29. In a die for operating on a flange or the like, a base, an operating head, movable vertically to and from the base, a die block carrying ring mounted on the head and movable vertically with respect to the head, a plurality of radially movable die blocks mounted on the ring and movable vertically therewith, guide means for radially guiding the die blocks in their movement on the ring, a contractible member interconnecting said die blocks and urging them inwardly and wedge means mounted on the head inside the die blocks adapted to cause outward radial movement of the blocks by virtue of downward motion of the blocks relative to the head.

30. In a die for operating on a flange or the like, an operating head movable vertically to and from the base, a die block carrying ring mounted on the head and slidable vertically with relation thereto, yielding means for urging said ring downwardly and means for limiting its downward movement, a plurality of radially movable die blocks mounted on the ring and constrained to slide radially thereon, a continuous spring encircling the several die blocks and adapted to urge the blocks inwardly, and a wedge ring mounted on the head inside the die blocks adapted by wedging action to cause outward movement of the die blocks by virtue of upward motion of the die blocks relative to the wedge ring.

31. In a die for operating on a flange or the like, an operating head movable vertically to and from the base, an upper die block carrying ring mounted on the head and movable vertically with relation thereto, a lower die block carrying ring mounted on the base and movable vertically with relation thereto, opposing inner and outer die blocks the inner block being mounted on the lower ring and movable radially thereon, the outer block being mounted on the upper ring and movable radially thereon, yielding means on the head urging said upper ring downwardly and yielding means on the base urging the lower ring upwardly to bring the blocks in opposing position, inner wedge means inside the inner die block and coacting therewith to force said inner block outwardly, outer wedge means outside the outer die blocks and coacting therewith to force said outer block inwardly, said inner wedge means and inner die block having abruptly angular wedge faces adapted to cause the inner block to move against the work in advance of the outer block.

In witness that I claim the foregoing, I have hereunto subscribed my name this 8th day of August, 1925.

ALFRED J. MUHLBACH.